United States Patent [19]

McMaster et al.

[11] Patent Number: 5,550,913
[45] Date of Patent: Aug. 27, 1996

[54] NETWORK TERMINATING UNIT FOR CONNECTING ANALOG AND DIGITAL COMMUNICATION SYSTEMS TO A DIGITAL NETWORK

[75] Inventors: Samuel McMaster, Nottinghamshire; Stephen A. Kirwan, Swindon, both of United Kingdom

[73] Assignee: The Post Office, London, United Kingdom

[21] Appl. No.: 244,886

[22] Filed: Dec. 9, 1994

[30] Foreign Application Priority Data

Dec. 9, 1991 [EP] European Pat. Off. ............ 91311440

[51] Int. Cl.$^6$ ............................ H04M 7/00; H04Q 11/04; H04J 3/02
[52] U.S. Cl. ........................ 379/230; 370/67; 370/85.1; 379/219; 379/225; 379/233; 379/234
[58] Field of Search .......................... 379/94, 207, 219, 379/220, 221, 229, 230, 233, 234, 225; 370/60.1, 94.1, 110.1, 67, 85.1

[56] References Cited

U.S. PATENT DOCUMENTS 5,420,916  5/1995  Sekiguchi ........................ 379/230

FOREIGN PATENT DOCUMENTS

| | | |
|---|---|---|
| 0185936 | 7/1986 | European Pat. Off. . |
| 0231630 | 8/1987 | European Pat. Off. . |
| 0361822 | 4/1990 | European Pat. Off. . |
| 2185657 | 7/1987 | United Kingdom . |

OTHER PUBLICATIONS

Patent Abstracts of Japan, vol. 9, No. 284 (E–357) (2007) 12 Nov. 1985 & JP, A, 60 126 997 (Nippon Denki) 06 Jul. 1985.

Tzung–Pau Lin, "A Multi–Function ISDN Home Communication System", *IEEE International Conference on Consumer Electronics*, pp. 368–369, Jun. 1990.

Primary Examiner—Jeffery Hofsass
Assistant Examiner—Harry S. Hong
Attorney, Agent, or Firm—Schwegman, Lundberg, Woessner and Kluth

[57] ABSTRACT

A network terminating unit, for interconnecting analog and digital communication systems to a digital network, having an analog voice module for connection to an analog private exchange, a high speed data communication module for connection to high speed communications devices, and an interface for common channel signalling connection to a digital network. The unit may further include a module for common channel signalling connectivity to a digital private exchange.

14 Claims, 4 Drawing Sheets

NETWORK TERMINATING UNIT FOR CONNECTING ANALOG AND DIGITAL COMMUNICATION SYSTEMS TO A DIGITAL NETWORK

FIELD OF THE INVENTION

This invention relates to communications terminal equipment, and specifically to a network terminating unit.

BACKGROUND OF THE INVENTION

In the field of voice and data telecommunications, there is an increasing use of digital communications techniques, allowing increased facilities to be provided to users of a network. However, many users already possess equipment designed for use with an analog network, and so there is a need to allow such users to gain access to the enhanced facilities available on a digital network, without being required to replace their existing equipment.

Thus, for example, there is known a multiplexer, to which analog private exchanges can be connected, and which converts the analog signals to digital signals, and multiplexes them for transmission along a digital line.

There is also known a private branch exchange (PABX), which has modules for connection to both analog and digital equipment, and is also connectable, using a common channel signalling protocol, to a digital network.

However, these known units do not allow the user to take advantage of all of the facilities potentially available on a digital telephone network.

The present invention therefore seeks to provide equipment which overcomes the disadvantages associated with the known units.

SUMMARY OF THE INVENTION

According to a first aspect of the present invention, there is provided communications terminal equipment comprising:

an analog voice module, for connection to an analog private exchange;

a high speed data communication module, for connection to high speed communications devices; and an interface for common channel signalling connection to a digital network.

This has the advantage that a user can retain existing analog exchanges, while incorporating new high speed devices into his system, and making maximum use of the facilities available on the digital network.

Preferably, the equipment further comprises a module for common channel signalling connectivity to a digital private exchange.

According to a second aspect of the present invention, there is provided communications terminal equipment comprising:

a digital connection module, for common channel signalling connection to a digital private exchange;

a high speed data communication module, for connection to high speed communications devices; and an interface for common channel signalling connection to a digital network.

BRIEF DESCRIPTION OF THE DRAWINGS

For a better understanding of the present invention, and to show how it may be brought into effect, reference will now be made, by way of example, to the accompanying drawings in which.

DETAILED DESCRIPTION OF THE PREFERRED EMBODIMENTS

Figure 1:
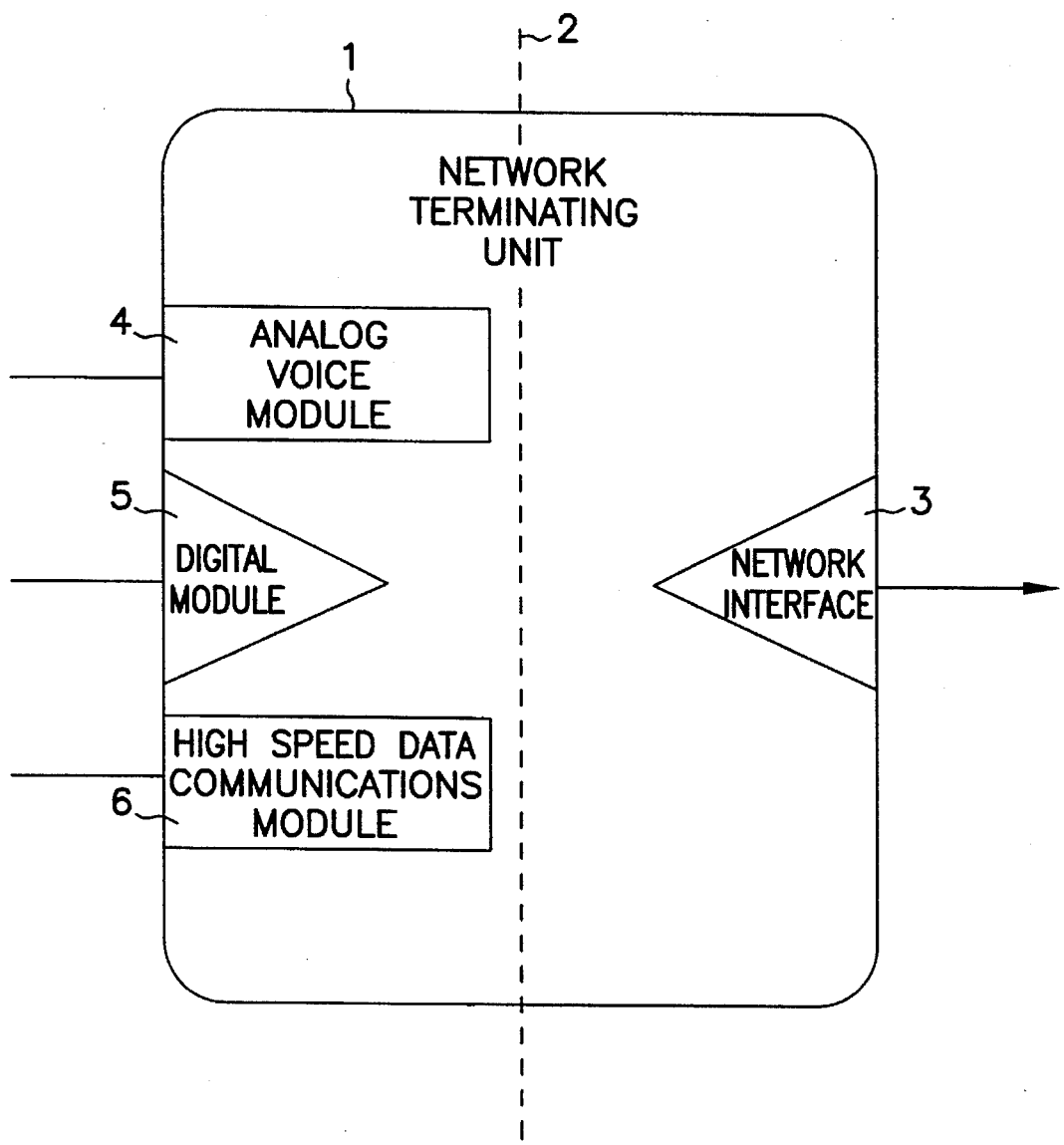
FIG. 1 is a schematic diagram illustrating equipment according to the present invention.

FIG. 1 schematically illustrates a network terminating unit in accordance with the present invention. The unit 1 is based on a conventional software-based networking platform. Such systems are well known to the person skilled in the art, and are used for connecting data communications and processing equipment to a digital network. As is known, the unit includes a power supply, a storage unit, a processing unit, and a console, and also includes modules for connection to the system and the attached equipment. The components within the unit 1 are interconnected by buses.

While such a system is generally known for data communications applications, the present invention uses a similar platform for connection to a telephone-based system. In the schematic representations shown in FIG. 1, the broken line 2 divides the unit into a network side and a user side. On the network side there is at least one network interface 3, while on the user side there is an analog voice module 4, a digital module 5, and a high-speed data communications module 6.

The network interface 3 provides a connection point for a digital core network using common channel signalling (CCS). For example, the connection may be a 2 Mbps connection using the DPNSS signalling protocol. The unit 1 may be provided with several such interfaces, allowing connection into different digital networks.

The analog voice module 4 is for connection to a user's analog PABX. Thus, the module 4 converts analog signals received from the PABX into digital signals for transmission to the network by the network interface 3, and converts incoming digital signals arriving at the network interface 3 into analog signals for transmission to the PABX. The unit 1 may be provided with as many analog voice modules as needed to allow connection to the required number of PABXs.

The unit 1 also includes at least one digital module 5, for connection to a digital PABX. Preferably, this module receives and transmits signals using the same CCS protocol, for example DPNSS, as the network interface. If so, the digital module may not need to convert the signals which are to be transmitted along, or which have been received from, the digital network.

In addition, the unit 1 includes at least one high-speed data communications module, i.e. a module for connection to equipment passing information at a rate which is, for example, a multiple of 64 Kbps. Thus, this module is also known as an N×64 Kbps module. Again, more than one such module can be provided if required to allow such connection to several high-speed devices, such as video conferencing equipment or FEP devices. As is well known, if the digital network transmits data in 64 Kbps blocks, it is necessary to incorporate into the high speed communications module 6 means for ensuring that the different blocks can be reassembled correctly on receipt.

Figure 2:
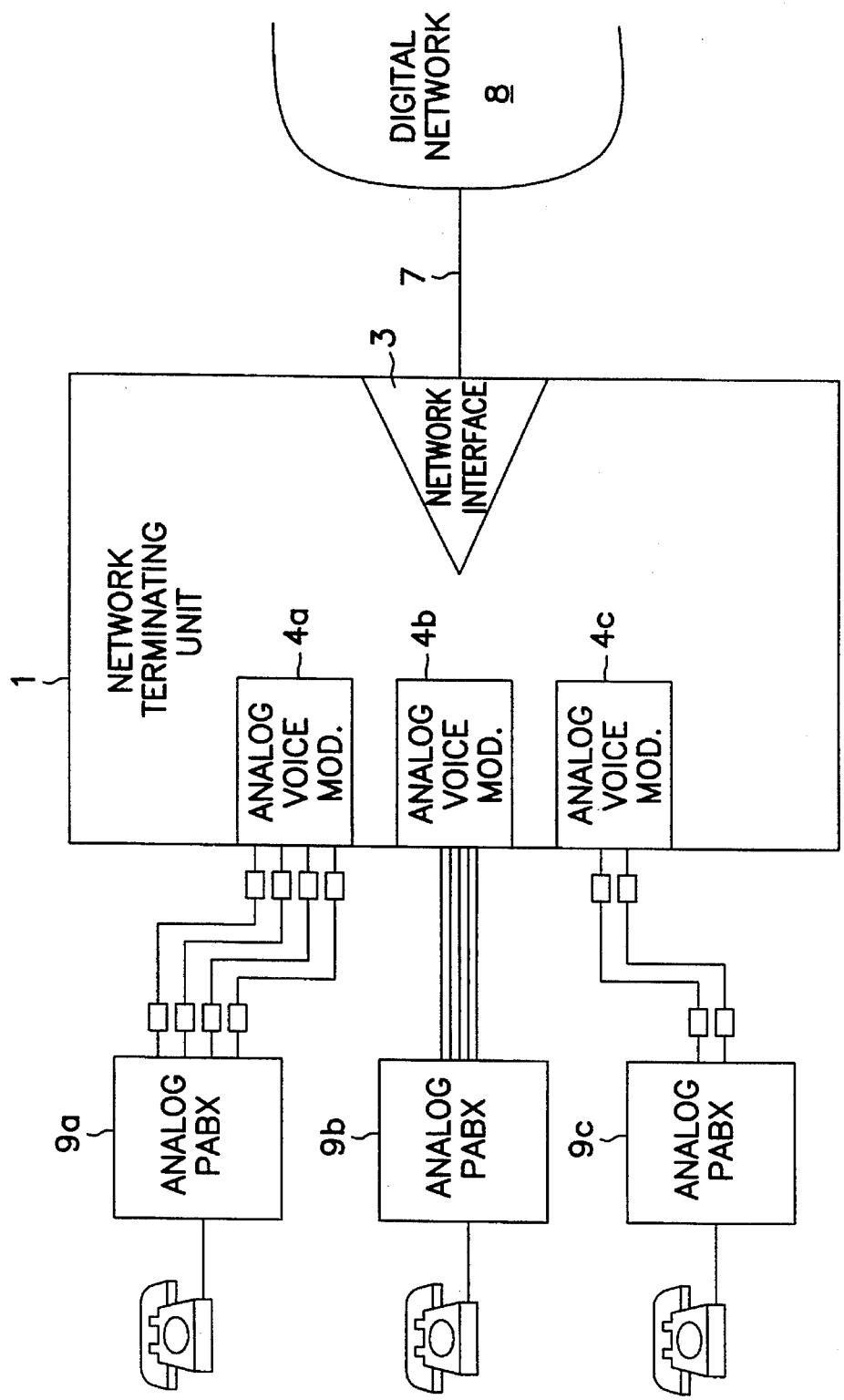
FIG. 2 is a schematic diagram illustrating a telecommunications system incorporating equipment according to the present invention.

Thus, while the person skilled in the art will be familiar with the principles of operation of each of the modules described above, the present invention provides equipment which, advantageously, allows access to a digital network from a wide variety of user equipment. FIG. 2 is a schematic representation of a part of a communications network, including a network terminating unit as described with reference to FIG. 1. The unit 1 includes a network interface, which is connected via a 2 Mbps digital trunk 7 to a digital telecommunications network, generally represented by reference 8.

The illustrated system includes three analog PABXs 9a, 9b, 9c, connected respectively to analog voice modules 4a, 4b, 4c. Thus, it can be seen that the unit 1 allows several different PABXs to be connected into the digital network, with the only limit being set by the amount of traffic carried by those PABXs and the other equipment which may be connected to digital modules or high speed data communications modules in the unit 1, and the capacity of the trunk 7.

The unit 1 can then be geographically located at the most convenient site, so as to minimise the requirement for trunks interconnecting the PABXs and the analog voice modules.

Thus, FIG. 2 shows the unit 1 located at the same site as the PABX 9b, with the PABX 9b being directly connected by six AC15 trunks to the analogue voice module 4b. The PABXs 9a, 9c are then located remotely from the unit 1, with the required number of AC15 trunks interconnecting them to the analogue voice modules.

The modules 4a, 4b, 4c are preferably such that users of telephones connected to the PABXs 9a, 9b, 9c have access to all telephones in the system. For example, if the user of a telephone connected to PABX 9a dials the number of a telephone connected to PABX 9b, the call may be connected between the modules 4a, 4b, without being passed into the digital network 8. The provision in this way of intelligence within the unit 1 reduces the load on the digital trunk 7. Alternatively, the modules 4a, 4b, 4c may be so designed that such calls are routed via the digital trunk 7 and the digital network 8.

Figure 3:
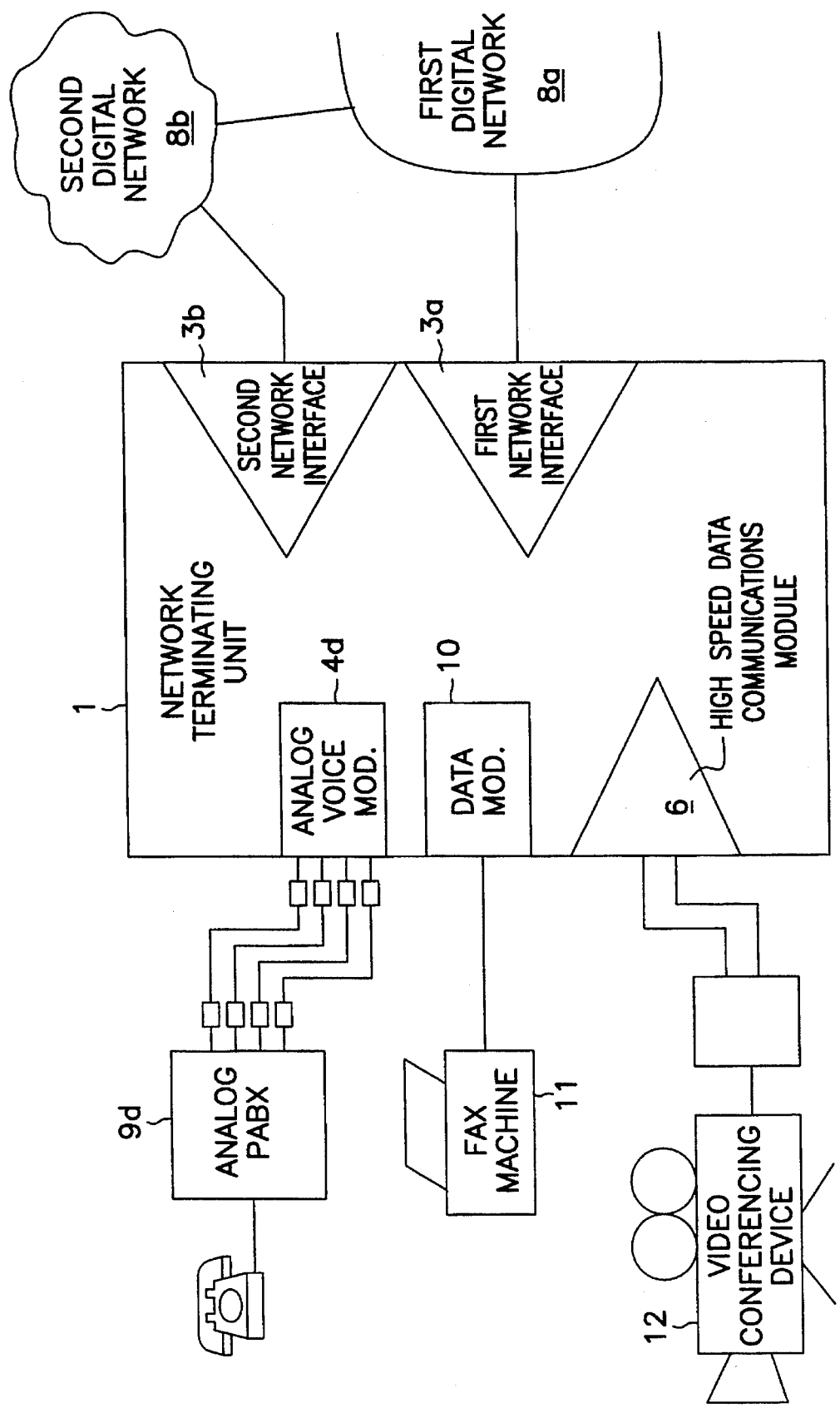
FIG. 3 is a schematic diagram of a second system incorporating equipment according to the present invention.

FIG. 3 is a schematic illustration of a further system incorporating a unit as described with reference to FIG. 1. The unit 1 includes a first network interface 3a, which is connected to a first digital network generally indicated by 8a, and also includes a second network interface 3b, which is connected to a second digital network generally indicated by reference 8b. The modules 3a, 3b may operate using different signalling protocols, e.g. DPNSS and DASS, depending upon the requirements of the networks to which they are connected. Moreover, the two digital networks 8a, 8b are themselves connected. For example, the first digital network 8a may be a private network owned by the user of the unit 1, while the second network 8b may be a public digital network. Thus, the provision of two network interfaces allows the end user to have access entirely over the private network 8a to other users of that network, and to have access via the public network 8b to the subscribers of that network. Moreover, connection in the illustrated form allows the provision of facilities such as "call break-out". This is useful if a user of the unit 1, located in a first city, wishes to make a call to a telephone belonging to a subscriber of the public network 8b, which is not connected to the private network 8a, located in a second city. The unit 1 can then direct that the signal is sent not entirely over the public network, but is sent through the private network between the two cities, and is sent over the public network only within the second city. This will ensure that the charge made by the public network to the owner of the private network is made at local call rates, and so will be minimised.

The unit 1 may also be provided with means for connection to two competing public networks, such that each individual call may be routed over which ever network offers the most advantageous service (e.g. the lowest tariff) for that particular call, depending for example on the destination being called and the time of day. Such routing may be done automatically, using information stored within the unit, without requiring the user to make a decision as to which network should be used. The unit supports all common channel signalling protocols necessary for this. The NTU can also support all of the necessary protocols to access Virtual Private Network services. This involves the utilisation of the routing algorithm, the ability to support diverse dial plans, and the relevant common channel signalling protocols.

The unit 1, shown in FIG. 3, also includes an analog voice module 4d, connected to an analog PABX 9d, in the same way as the PABX 9b is connected to the analog voice module 4b in the system shown in FIG. 2. The unit 1 also includes an additional data module 10 of known type, for passing data at a rate of 64 Kbps. This is for connection to equipment which transmits and receives data at that rate, for example a Group IV facsimile machine 11. Again, the form of the 64 Kbps data module 10 will be known in itself to persons skilled in the art.

The unit 1 further includes a high speed data communications module 6, shown connected to a video conferencing device 12, requiring 2×64 Kbps. The module 6 includes a facility for ensuring that signals sent from such high speed equipment, or received for such high speed equipment, are correctly reassembled from the 64 kbps blocks into which they will be divided for transmission over the network. As is known, however, the effect of this is that the actual effective data transmission rate is somewhat lower than that which is theoretically available, because of the need to provide data which are used solely for this purpose.

Figure 4:
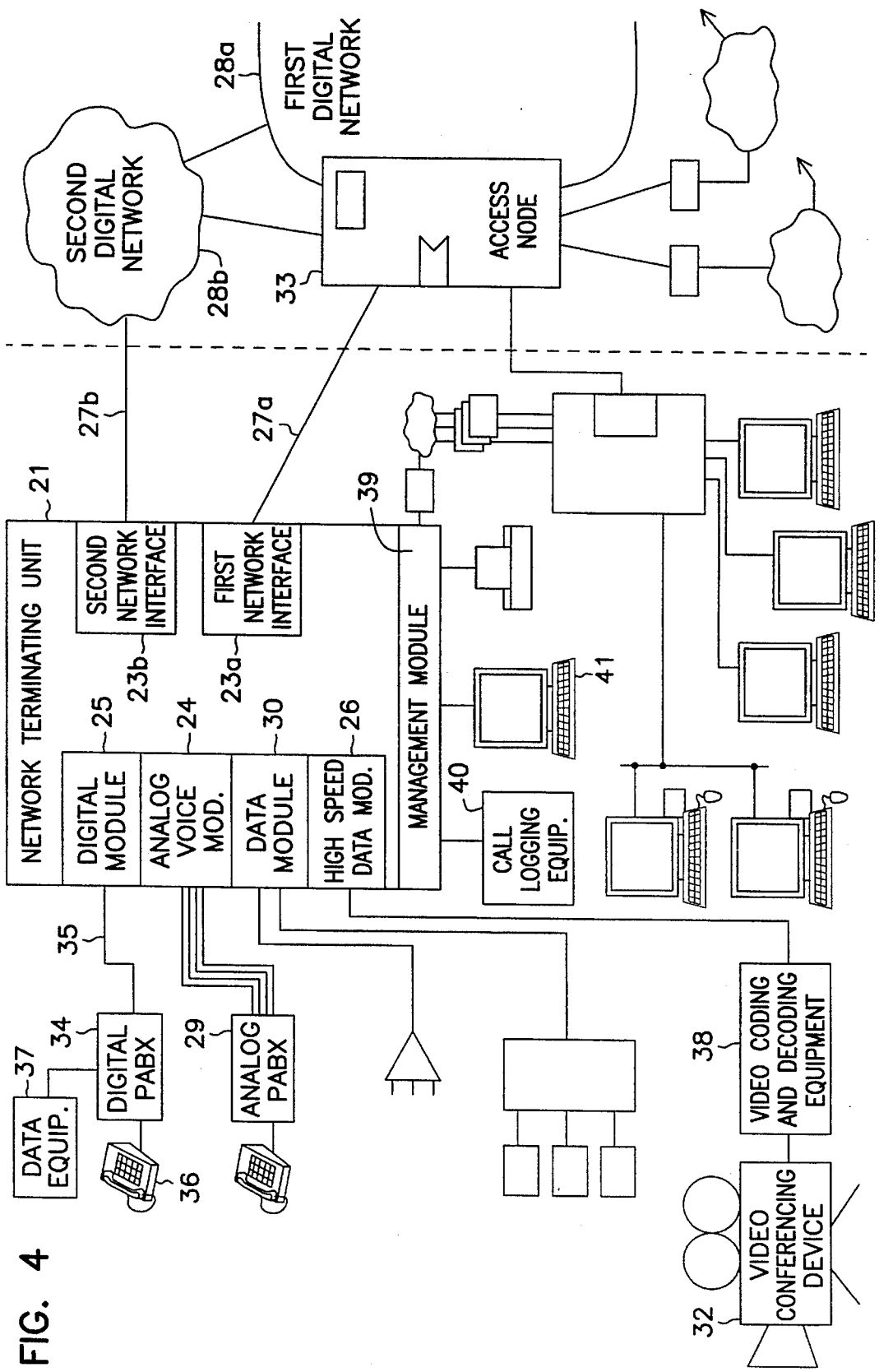
FIG. 4 schematically illustrates an alternative system incorporating equipment according to the invention.

FIG. 4 is a schematic illustration of a further system, which incorporates an alternative embodiment of the unit in accordance with the present invention. Like the unit 1, shown in FIGS. 1–3, the unit 21 includes two network interfaces 23a, 23b, connected via respective 2 Mbps trunks 27a, 27b, to respective digital networks 28a, 28b. The first trunk 27a is connected to the network 28a by means of an access node 33, which alternatively allows connection to the second digital network 28b. As described with reference to FIG. 3, the first network 28a may be a privately owned network, while the second network 28b may be a public digital network.

The unit 21 also includes an analogue voice module 24, connected to an analogue PABX 29, such that users with telephones connected to the PABX 29 have full access to all of the users of either digital network 28a or 28b as well as users connected to the unit 21.

The unit 21 further includes a digital module 25, connected to a digital PABX 34 by means of a 2 Mbps trunk 35. The PABX 34 is then able to support telephones 36 and 64 Kbps data equipment 37 connected thereto. The module 25 may use the same signalling protocol as the module 23a, in which case, for calls passing through these two modules from PABX 34 to network 28a, the signalling may not need to be converted.

The unit 21 also includes a high speed (n×64 Kbps) data module 26, shown connected via video coding and decoding equipment 38 to a video conferencing device 32.

The unit 21 also includes a 64 Kbps data module 30, to which appropriate end user equipment can be connected.

FIG. 4 also illustrates the management module 39 of the unit 21. Of course, a similar module is present in the unit 1 shown in FIGS. 1–3. Connected to the management module 39 are a number of items of equipment for use by the owner of the unit 21, in managing the telecommunications system. For example, equipment 40 may be provided for call logging, together with a console 41 for local connection to the management module 39. The management module is able to provide information about all calls routed through the unit 21, for example connection and disconnection times, nodes at which call is originated and received, and the route over which the call is sent.

Thus, the unit 21 is essentially the same as the unit 1 as previously described, but further includes a module 25 for connection to a PABX by means of a common channel signalling protocol, for example DPNSS at 2 Mbps, along a suitable trunk 35.

As before, connections via this module, and via all other modules, can be made in such a way that all other users, connected to either of the digital networks 28a, 28b, are easily accessible, in exactly the same way as users connected to the same PABX as the originating caller.

The equipment in accordance with the invention, either the unit 1 in FIGS. 1–3 or the unit 21 in FIG. 4, thus allows the user to connect a wide variety of equipment into a digital network. Thus, for example analog PABXs or digital PABX's, or a mixture of the two, together with data communications equipment, may be connected to such a digital network. The users connected to such PABX's have the benefit of all of the available facilities of the network, by virtue of the intelligence provided in the unit.

It can therefore be seen that the present invention provides communications terminal equipment which allows interconnection between a wide variety of telecommunications devices and a digital network, while allowing the user to retain the maximum amount of flexibility in the devices which he uses.

We claim:

1. Communications terminal equipment comprising:
   an analog voice module, for connection to an analog private exchange;
   a high speed data communication module, for connection to high speed communications devices;
   a first interface for a common channel signalling connection to a first digital network; and
   a second interface for a common channel signalling connection to a second digital network.

2. Equipment as claimed in claim 1, further comprising a module for common channel signalling connectivity to a digital private exchange.

3. Equipment as claimed in claim 1, wherein a user of communications equipment, which is connected to an analog private exchange connected thereto, is able to communicate via said analog voice module and said interface with users of said digital network.

4. Equipment as claimed in claim 1, wherein the equipment comprises a storage unit, a processing unit, and buses interconnecting the modules and the interfaces.

5. Equipment as claimed in claim 1, wherein a telephone call, from a unit connected to the equipment via a first private exchange, to a unit connected to the equipment via a second private exchange, is routed through the equipment without being passed via the interfaces to the network.

6. Equipment as claimed in claim 1, wherein the first and second interfaces operate different signalling protocols.

7. Equipment as claimed in claim 1, wherein calls from communications equipment connected thereto to communications equipment accessible via either the first or second digital network are automatically routed via the most favorable network.

8. Equipment as claimed in claim 1, comprising means for storing details of all calls routed therethrough.

9. Communications terminal equipment comprising:
   a digital connection module, for common channel signalling connection to a digital private exchange;
   a high speed data communication module, for connection to high speed communications devices;
   a first interface for common channel signalling connection to a first digital network; and
   a second interface for a common channel signalling connection to a second digital network.

10. Equipment as claimed in claim 9, wherein the equipment comprises a storage unit, a processing unit, and buses interconnecting the modules and the interfaces.

11. Equipment as claimed in claim 9, wherein a telephone call, from a unit connected to the equipment via a first private exchange, to a unit connected to the equipment via a second private exchange, is routed through the equipment without being passed via the interfaces to the network.

12. Equipment as claimed in claim 9, wherein the first and second interfaces operate different signalling protocols.

13. Equipment as claimed in claim 9, wherein calls from communications equipment connected thereto to communications equipment accessible via either the first or second digital network are automatically routed via the most favorable network.

14. Equipment as claimed in claim 9, comprising means for storing details of all calls routed therethrough.

* * * * *